United States Patent [19]

Miyamoto et al.

[11] Patent Number: 5,430,090
[45] Date of Patent: Jul. 4, 1995

[54] HOT-MELT ADHESIVE

[75] Inventors: Yoshihiko Miyamoto, Hirakata; Masahiro Saitoh, Yao, both of Japan

[73] Assignee: Nippon Gohsei Kagaku Kogyo Kabushiki Kaisha, Osaka, Japan

[21] Appl. No.: 199,028

[22] Filed: Feb. 18, 1994

[30] Foreign Application Priority Data

Feb. 22, 1993 [JP] Japan ................. 5-057724
Feb. 22, 1993 [JP] Japan ................. 5-057725

[51] Int. Cl.$^6$ .............................................. C08K 5/04
[52] U.S. Cl. ................................. 524/320; 524/317; 524/547; 524/555; 524/557
[58] Field of Search ............. 524/320, 317, 547, 555, 524/557

[56] References Cited

U.S. PATENT DOCUMENTS

| | | | |
|---|---|---|---|
| 3,932,563 | 1/1976 | Argurio et al. | 524/320 X |
| 4,781,948 | 11/1988 | Caldwell | 524/320 X |
| 5,143,961 | 9/1992 | Scholl et al. | 524/320 X |
| 5,270,372 | 12/1993 | Hirose et al. | 524/320 X |

FOREIGN PATENT DOCUMENTS

| | | | |
|---|---|---|---|
| 0738829 | 2/1970 | Belgium | 524/320 |
| 0002069 | 1/1967 | Japan | 524/320 |
| 0130933 | 12/1974 | Japan | 524/320 |
| 0052209 | 5/1975 | Japan | 524/320 |
| 0047606 | 6/1976 | Japan | 524/320 |
| 0021250 | 2/1978 | Japan | 524/320 |
| 0091751 | 5/1983 | Japan | 524/320 |
| 0056196 | 12/1985 | Japan . | |
| 60-56196 | 12/1985 | Japan . | |
| 1245301 | 9/1971 | United Kingdom | 524/320 |
| 0572482 | 9/1977 | U.S.S.R. | 524/320 |

*Primary Examiner*—Judy M. Reddick
*Attorney, Agent, or Firm*—Armstrong, Westerman, Hattori, McLeland & Naughton

[57] ABSTRACT

The invention relates to a polyvinyl acetate resin composition comprising a hydrophilic polyvinyl acetate resin rendered soluble or dispersible in water by partial saponification or introduction of hydrophilic groups (A), a hydroxy fatty acid compound of not less than 6 carbon atoms (B) and a plasticizer (C).

1 Claim, No Drawings

HOT-MELT ADHESIVE

FIELD OF THE INVENTION

This invention relates to a polyvinyl acetate resin composition either soluble or dispersible in water and having a hot-melt property. The invention further relates to a hot-melt adhesive comprising the composition and to a method of manufacturing the hot-melt adhesive.

BACKGROUND OF THE INVENTION

Compared with other adhesives, hot-melt adhesives are advantageous in that they can be applied to a broad range of adherends, feature a very high rate of adhesion, and are of low intoxication and hazard potential and more economic and, therefore, have been used broadly in such applications as bookbinding, packaging, carpentry, shoemaking, fabric bonding and so forth.

Hot-melt adhesives have to satisfy various performance requirements such as bonding strength, meltability, heat resistance, cold resistance and flexibility. The base polymers used for such hot-melt adhesives are generally ethylene-vinyl acetate copolymer, polyethylene, polypropylene, polyamide and polyester resins.

As the hot-melt adhesives for use in fiber oriented fields such as bookbinding, bag making, carton making, woodworking, etc., ethylene-vinyl acetate copolymer having satisfactory adhesiveness, workability and flexibility characteristics is in widespread use.

However, since ethylene-vinyl acetate copolymer is hydrophobic, hot-melt adhesives containing this copolymer as the base polymer have the drawback that when, for instance, stock paper carrying such an adhesive is treated with water for regeneration, the paper is not uniformly dissolved or dispersed to cause troubles.

Recently, interest is mounting in hot-melt adhesives using water-soluble polyvinyl alcohol resin as the polymer base.

However, since vinyl alcohol resin is high-melting and shows a high melt viscosity at low temperature, this resin alone is not suitable for hot-melt adhesive use. Therefore, some plasticer such as glycerin, ethylene glycol or the like is added to the resin but the mere addition of a plasticizer is not successful for reducing the melting point and melt viscosity to the necessary levels. For this reason, hot-melt adhesives based on polyvinyl alcohol are of necessity used at high temperature (not less than 180° C) but the use of such a high temperature for melting tends to cause a thermal degradation of the polyvinyl alcohol resin and lower the compatibility of the resin with other ingredients.

In addition, since polyvinyl alcohol resin has the property to become brittle at low temperature, products assembled with a PVA-based hot-melt adhesive are liable to fail at the joints especially in cold districts and are, therefore, of low market value.

Moreover, compared with the more conventional hot-melt adhesives, PVA-based adhesives absorb moisture in the highly humid environment to deteriorate in bond strength and blocking resistance.

Japanese Patent Publication No. 56196/1985 describes a water-soluble/-dispersible hot-melt adhesive composition comprising a polyvinyl alcohol modified with an olefinsulfonic acid or an alkali metal salt thereof and a plasticizer.

However, this water-soluble/-dispersible hot-melt adhesive is also deficient in bond strength and blocking resistance under high-humidity conditions.

It is an object of this invention to provide a water-soluble/-dispersible polyvinyl acetate resin composition which is low-melting and shows a low melt viscosity in a low-temperature region, with reduced brittleness at low temperature and insuring satisfactory bond strength and blocking resistance under high-humidity conditions.

It is a further object of the invention to provide a hot-melt adhesive comprising said resin composition and a method for its manufacture.

SUMMARY OF THE INVENTION

The polyvinyl acetate resin composition of this invention comprises a hydrophilic polyvinyl acetate resin (A), which is a polyvinyl acetate resin which has been rendered water-soluble or water-dispersible by partial saponification or introduction of hydrophilic groups, a hydroxy fatty acid compound of not less than 6 carbon atoms (B), and a plasticizer (C).

The hot-melt adhesive of this invention is a melt-blend comprising a hydrophilic polyvinyl acetate resin (A), which is a polyvinyl acetate which has been rendered water-soluble or water-dispersible by partial saponification or introduction of hydrophilic groups, a hydroxy fatty acid compound of not less than 6 carbon atoms (B), and a plasticizer (C).

The method for manufacturing the hot-melt adhesive of this invention comprises melt-blending a hydrophilic polyvinyl acetate resin (A), which is a polyvinyl acetate resin which has been rendered water-soluble or water-dispersible by partial saponification or introduction of hydrophilic groups, a hydroxy fatty acid compound of not less than 6 carbon atoms (B), and a plasticizer (C), casting the resulting blend on a belt on which it is allowed to cool, and finally cutting it.

DETAILED DESCRIPTION OF THE INVENTION

Hydrophilic polyvinyl acetate resin (A)

The hydrophilic polyvinyl acetate resin (A) for use in this invention is a polyvinyl acetate resin which has been rendered either soluble or dispersible in water by partial saponification or introduction of hydrophilic groups.

Preferably, the hydrophilic polyvinyl acetate resin (A) is (A1) a partially saponified polyvinyl acetate resin with an average saponification degree of 30–85 mole % and an average polymerization degree of 50–700, which may optionally contain a hydrophilic group-containing monomer unit, or (A2) a polyvinyl acetate resin with an average saponification degree of 0–30 mole % and an average polymerization degree of 50–700, which contains 0.1–30 mole % of a hydrophilic group-containing monomer unit. The hydrophilic group-containing monomer unit which is optionally contained in the former polyvinyl acetate resin (A1) or essentially contained in the latter polyvinyl acetate resin (A2) is preferably a monomer unit having a sulfonic acid group or an oxyalkylene group.

The above-mentioned polyvinyl acetate resin (A1) includes not only saponified vinyl acetate polymers but also saponified copolymers of vinyl acetate with other monomers such as olefins such as ethylene, propylene, isobutylene, α-octene, α-dodecene, α-octadecene, etc., inclusive of unsaturated acids such as acrylic acid, methacrylic acid, crotonic acid, maleic acid, maleic anhydride, itaconic acid, etc., inclusive of their salts, mono- or di-alkyl esters; nitriles such as acrylonitrile, methacrylonitrile, etc., amides such as acrylamide, methacrylamide, etc.; olefinsulfonic acids such as ethylenesulfonic acid, allylsulfonic acid, methallylsulfonic acid, etc., inclusive of their salts; alkyl vinyl ethers; N-acrylamidomethyltrimethylammonium chloride, allyltrimethylammonium chloride; dimethyldiallyl vinyl ketone; N-vinylpyrrolidone; vinyl chloride; vinylidene chloride; polyoxyalkylene (meth)allyl ethers such as polyoxyethylene (meth)allyl ether, polyoxypropylene (meth)allyl ether, etc.; polyoxyalkylene (meth)acrylates such as polyoxyethyelene (meth)acrylate, polyoxypropylene (meth)acrylate, etc.; polyoxyalkylene(meth)acrylamides such as polyoxyethylene(meth)acrylamide, polyoxypropylene(meth)acrylamide, etc.; polyoxyethylene (1-(meth)acrylamido-1,1-dimethylpropyl) ester; polyoxyethylene vinyl ether, polyoxypropylene vinyl ether; polyoxyethyleneallylamine, polyoxypropylenealkylamine, polyoxyethylenevinylamine, polyoxypropylenevinylamine and so on. Among the above-mentioned comonomers, monomers having a sulfonic acid group and those having an oxyalkylene group are typical hydrophilic group-containing monomers.

The polyvinyl acetate resin (A1) has an average degree of saponification in the range of preferably 30–85 mole % and, for still better results, 45–70 mole % and an average degree of polymerization in the range of preferably 50–700 and, for still better results, 100–500. When the average degree of saponification is below 30 mole %, the resin shows a high blocking tendency and is not soluble in water. On the other hand, when it exceeds 85 mole %, the resin will show a high melting point. When the average degree of polymerization is less than 50, the bond strength is not sufficiently high. When it exceeds 700, the resin has a high melt viscosity.

The polyvinyl acetate resin (A2) can be provided by copolymerizing vinyl acetate, as the main monomer, with one or more hydrophilic group-containing monomers copolymerizable therewith. The hydrophilic group-containing monomer includes sulfonic acid group-containing monomers, carboxyl group-containing monomers, oxyalkylene group-containing monomers, etc. Particularly preferred are sulfonic acid group-containing monomers and oxyalkylene group-containing monomers.

Among the sulfonic acid group-containing monomers mentioned above are (meth)allylsulfonic acid, ethylenesulfonic acid, 2-(meth)acrylamido-2- methylpropanesulfonic acid, 2-acrylamido-1-methylpropanesulfonic acid, sodium (meth)allylsulfonate, sodium ethylenesulfonate, sulfoalkyl maleate such as sodium monosulfoalkyl maleate, sodium disulfoalkyl maleate, etc.; sodium 2-(meth)acryl-amido-2-methylpropanesulfonate, sodium 2-(meth)acryl-amido-1-methylpropanesulfonate and so on.

Among the carboxyl group-containing monomers mentioned above are (meth)acrylic acid, crotonic acid, maleic acid, anhydrous maleic acid, itaconic acid, etc., inclusive of their sodium salts, potassium salts and partial esters.

The oxyalkylene group-containing monomer includes, among others, polyoxyalkylene (meth)allyl ethers, polyoxyalkylene (meth)acrylates, polyoxyalkylene (meth)acrylamides, polyoxyalkylene (1-(meth)acrylamido-1,1-dimethylpropyl) esters, polyoxyalkylene vinyl ethers, polyoxyalkylene-allylamines and polyoxyalkylenevinylamines. The degree of condensation of polyoxyalkylene is preferably 1–300 and, for still better results, 3–50.

The polyvinyl acetate resin (A2) need not be saponified but may be saponified to the extent of less than 30 mole %. The average degree of polymerization of the polyvinyl acetate resin (A2) is preferably 50–700 and, for still better results, 100–500. When the average degree of polymerization is below 50, the bond strength is not sufficient. When it exceeds 700, the melt viscosity is increased. The copolymerization ratio of the hydrophilic group-containing monomer is preferably 0.1–30 mole % and, for still better results, 1–20 mole %. When the copolymerization ratio of the hydrophilic group-containing monomer is less than 0.1 mole %, the water-solubility/dispersibility is not sufficient. When it exceeds 30 mole %, the bond strength is not sufficient.

Hydroxy fatty acid (B)

The hydroxy fatty acid compound (B) includes hydroxy fatty acids of not less than 6 carbon atoms such as 2-hydroxy-2-methylpentanoic acid, 2-hydroxy-5-methylhexanoic acid, 3-hydroxy-2-methylpentanoic acid, 11-hydroxytetradecanoic acid, 11-hydroxyhexadecanoic acid, 14-hydroxyhexadecanoic acid, 12-hydroxydodecanoic acid, 16-hydroxyhexadecanoic acid, 12-hydroxyoctadecanoic acid, 9-hydroxyoctadecanoic acid, 22-hydroxydocosanoic acid, etc., and alkali metal salts and esters of such acids. Hydroxy fatty acids of 5 or less carbon atoms are not suited for purposes of this invention. Among the above-mentioned compounds, 12-hydroxyoctadecanoic acid is particularly desirable for practical purposes.

Plasticizer (C)

The plasticizer (C) can be virtually any compound capable of plasticizing the hydrophilic polyvinyl acetate resin (A) and includes, among others, a variety of polyols such as glycerol, diglycerol, polyglycerol, pentaerythritol, pentamethylene glycol, ethylene glycol, diethylene glycol, triethylene glycol, tetraethylene glycol, polyethylene glycol, propylene glycol, polypropylene glycol, methylpentanetriol, sorbitol, mannitol, etc. and urea derivatives such as ethyleneurea.

Resin composition

The polyvinyl acetate resin composition of this invention comprises the above-described hydrophilic polyvinyl acetate resin (A), hydroxy fatty acid compound (B) and plasticizer (C).

The proportions of these ingredients are preferably as follows. Thus, based on 100 parts by weight of hydrophilic polyvinyl acetate resin (A), the hydroxy fatty acid compound (B) is used in a proportion of 5–100 parts by weight (preferably 10–80 parts by weight) and the plasticizer is used in a proportion of 5–50 parts by weight (preferably 10–40 parts by weight). When the proportion of hydroxy fatty acid compound (B) is less than 5 parts by weight, the effect of the invention is not manifested well, while the use of (B) in excess of 100 parts by weight renders the composition only sparingly soluble in water. When the proportion of plasticizer (C) is less than 5 parts by weight, no sufficient plasticizing effect can be realized. On the other hand, when the plasticizer (C) is used in a proportion of more than 50 parts by weight, the composition is tacky at room temperature.

The above ingredients are melt-blended by means of a melting tank equipped with a stirrer, a melt-extruder, roll kneader or other machine. There is no limitation on the order of blending. Thus, the three ingredients can be melt-blended all together in one operation or two of them are first blended and the remaining one is then added and further blended. The preferred melt-blending temperature is about 100–180° C.

Within the range not contrary to the object of this invention, other polymers such as ethylene-vinyl acetate copolymer, polyesters, polypropylene, polyamides, etc. can also be incorporated in the resin composition or conversely the resin composition may be added to such polymers.

Hot melt adhesive and method for manufacture

The resin composition obtainable by melt-blending the hydrophilic polyvinyl acetate resin (A), hydroxy fatty acid compound (B) and plasticizer (C) is of value as a hot-melt adhesive. For this application, the resin composition may further contain tackifiers such as rosin, rosin esters, pinene polymers, hydrogenated petroleum resins, hydrocarbon resins, etc., antioxidants, lubricants, fillers, coloring agents, stabilizers and other additives for hot-melt adhesive use.

In the manufacture of a hot-melt adhesive, the above ingredients are melt-blended and molded into optional products such as blocks, strips, biscuits, pellets, ropes, powder, film and so on. The molding technology is dependent on the desired product shape. Taking strips, which are most usual, as an example, the melt-blend can be cast from a feeder onto a stainless steel or other belt and cooled indirectly with spray mists of cooling water delivered against the reverse side of the belt. After cooling, the solidified product is separated from the belt and cut into strips.

There is no particular limitation on adherends for this hot-melt adhesive. Thus, the hot-melt adhesive of this invention can be used in a diversity of applications such as fabrication of corrugated board boxes and cartons, sealing of cartons and boxes, packaging of drugs, confections, toys, etc., binding of telephone directories, catalogs, slips, etc., top-, bottom- or side sealing of bags, manufacture of corrugated board pallets, fiber cans, paper tubes, labels and other products, production of sanitary supplies such as paper diapers, woodworking such as furniture and cabinet assembling, production of aluminum and polypropylene cans, architectural applications such as finishing of aluminum sashes and ceilings with decorative paper, shoemaking such as tucking, bottoming, etc., automotive applications such as oil filters and head lamps, clothing uses such as hemming of coats, leather and cloth bonding, reinforcing, etc., electrical applications such as temporary fixation of TV yokes and speaker coils, sunday carpentry and other general repair jobs.

Other uses

While the above uses are chiefly pertinent to the hot-melt adhesive of this invention, the resin composition of this invention can further be used in the manufacture of bottles, film, sheet, hoses, tubes, vessels, bags, textile products, foam products and other shaped articles and in paper sizing and processing applications, to name but a few examples.

The effects of the invention

The polyvinyl acetate resin composition of this invention containing a hydroxy fatty acid compound of not less than 6 carbon atoms shows a low melting point and a low melt viscosity at low temperature. Therefore, in its application as a water-soluble or dispersible hot-melt adhesive, the resin composition provides for improved workability and for reduced brittleness in cold climates. In addition, the composition does not deteriorate in bond strength and blocking resistance even in highly humid environments. Another advantage of the invention is that the existing production and application hardware for ethylene-vinyl acetate copolymer and other compositions can be utilized as they are.

EXAMPLES

The following examples are intended to illustrate this invention in further detail. In the examples, all parts and % are by weight unless otherwise specified.

Example 1

Resin composition

A blending tank was charged with 100 parts of a polyvinyl alcohol with an average saponification degree of 65 mole % and an average polymerization degree of 250, 25 parts of 12-hydroxyoctadecanoic acid and 25 parts of glycerin and the charge was melt-blended at 70° C. to provide a resin composition.

The melting point, melt viscosity and low-temperature flexibility of the composition were determined.
(Melting point)

The melting point was determined by means of Perkin-Elmer DSC-7 (Perkin-Elmer) at a temperature escalation rate of 20° C./min.
(Melt viscosity)

The melt viscosity values of the composition at 140° C and 170° C were determined in accordance with JAI-7-1991 using a Brookfield rotary viscosimeter at a spindle (No. 29) speed of 100 rpm.
(Low-temperature flexibility)

In accordance with JAI-7-1991, a 1 mm-thick sheet sample (20 mm W×80 mm L) was prepared and allowed to stand at −10° C. for at least 2 hours. Then, the sample was bent about a 1 mm (dia.) mandrel through 180 degrees to check for cracks at the bend.

o: No cracking
Δ: Partial cracking
x: Total cracking

Hot-melt adhesive

The melt-blended composition was cast in the strand form from a feeder onto a stainless steel belt and cooled with jets of cooling water delivered against the reverse side of the belt. The strands were peeled off from the belt and cut with a rotary cutter into strips 20 mm long, 20 mm wide and 3 mm in thickness.

The bond strength and water solubility/dispersibility of this hot-melt adhesive were determined.
(Bond strength)

The above hot-melt adhesive was melted by heating and coated in a thickness of 100–150 μm on kraft paper. A sheet of wood-free paper was placed on the coated side of the kraft paper and the assembly was passed over a hot roll at about 150° C. to give an adhesive paper. This adhesive paper was allowed to stand at 20° C., 65% RH for at least 24 hours and the 180° peel strength was measured under the same conditions at a pulling speed of 30 mm/min.
(Water solubility/dispersibility)

The above hot-melt adhesive strip was placed and gently agitated in water at 20° C. and its condition was investigated 1 hour later.

Example 2

A resin composition was prepared by melt-blending 100 parts of a polyvinyl alcohol having an average saponification degree of 70 mole % and an average polymerization degree of 400 with 30 parts of 14- hydroxyhexadecanoic acid and 25 parts of glycerin and using this composition the experiments described in Example 1 were repeated.

to crack on cutting and failed to provide strips of uniform shape.

The results of experiments in Examples 1–5 and

TABLE 1

| | Melting point (°C.) | Melt viscosity (CPS) | | Low-temperature flexibility | Bond strength (kg/30 mm) | Water solubility/ dispersibility |
|---|---|---|---|---|---|---|
| | | 140° C. | 170° C. | | | |
| Example 1 | 85 | 6000 | 2500 | | 0.55 (Broken) | Completely dispersed |
| Example 2 | 79 | 7000 | 3000 | | 0.51 (Broken) | Completely dispersed |
| Example 3 | 82 | 9500 | 4000 | | 0.52 (Broken) | Completely dispersed |
| Example 4 | 80 | 7000 | 3500 | | 0.50 (Broken) | Completely dispersed |
| Example 5 | 80 | 6000 | 2000 | | 0.53 (Broken) | Completely dispersed |
| Comparison Example 1 | 120 | Not measurable | 7500 | x | 0.48 (Broken) | Completely dispersed |
| Comparison Example 2 | 125 | Not measurable | 8500 | x | 0.46 (Broken) | Completely dispersed |

(Note)
"Completely dispersed" means that the sample is mostly dissolved, with an undissolved portion being uniformly dispersed.
"Broken" means adherend failure.

Example 3

A resin composition was prepared by melt-blending 100 parts of a sodium allylsulfonate (0.5 mole %)-modified polyvinyl alcohol having an average saponification degree of 75 mole % and an average polymerization degree of 200 with 40 parts of 12-hydroxydodecanoic acid and 20 parts of triethylene glycol and using this composition the experiments described in Example 1 were repeated.

Example 4

A resin composition was prepared by melt-blending 100 parts of a polyvinyl alcohol having an average saponification degree of 65 mole % and an average polymerization degree of 200 with 25 parts of 12-hydroxyoctadecanoic acid, 20 parts of tetraethylene glycol and 15 parts of ethylene-vinyl acetate copolymer with a vinyl acetate content of 28 wt. %, and using this composition the experiments described in Example 1 were repeated.

Example 5

A resin composition was prepared by melt-blending 35 parts of a polyvinyl alcohol having an average saponification degree of 45 mole % and an average polymerization degree of 250 and 65 parts of a polyvinyl alcohol having an average saponification degree of 70 mole % and an average polymerization degree of 100 with 17 parts of 12-hydroxyoctadecanoic acid and 25 parts of glycerin and using this composition the experiments described in Example 1 were repeated.

Comparison Example 1

Except that 12-hydroxyoctadecane was omitted, the procedure and experiments of Example 1 were repeated.

The resin composition was so brittle that when it was molded in a hot-melt adhesive as in Example 1, it tended to crack on cutting and failed to provide strips of uniform shape.

Comparison Example 2

Except that glycerin was omitted, the procedure and experiments of Example 1 were repeated.

This resin composition was so brittle that when it was molded in a hot-melt adhesive as in Example 1, it tended

Example 6

A blending tank was charged with 100 parts of a polyvinyl acetate modified with 3.0 mole % of sodium allylsulfonate (average degree of polymerization 300), 25 parts of 12-hydroxyoctadecanoic acid and 25 parts of glycerin and the charge was melted at 170° C.

The molten composition was cast in the strand form from a feeder onto a stainless steel belt and the strands spread without overlap on the belt were cooled with jets of cooling water delivered against the reverse side of the belt. The solidified strands were peeled off from the belt and cut with a rotary cutter into chips 20 mm long, 20 mm wide and 3 mm in thickness.

Then, the bond strength, blocking resistance and water solubility/dispersibility of this hot-melt adhesive were determined.

(Bond strength)

The above hot-melt adhesive was melted by heating and coated in a thickness of 100–150 μm on kraft paper. Then, a sheet of wood-free paper was placed on the coated side of the kraft paper and the assembly was passed over hot rollers at about 150° C. to give an adhesive paper. This adhesive paper was allowed to stand at (1) 20° C., 65% RH or (2) 40° C., 80% RH, for at least 24 hours and then, the 180° peel strength was determined under the same conditions using a pulling speed of 30 mm/min.

(Blocking resistance)

The above hot-melt adhesive was melted by heating and coated in a thickness of 100–150 μm on kraft paper. After the coating had cooled to room temperature, a sheet of wood-free paper was placed on the coated side of the kraft paper and the assembly was allowed to stand under a load of about 0.5 kg/cm² at 40° C., 80% RH for 24 hours. Then, the peel strength was measured at a pulling speed of 30 mm/min and the blocking resistance was evaluated.

| | | (Peel strength) |
|---|---|---|
| ○: | No blocking at all | (<0.05 kg/30 mm) |
| Δ: | Partial blocking | (0.05–0.15 kg/30 mm) |

-continued

| | (Peel strength) |
|---|---|
| x: Total blocking | (>0.15 kg/30 mm) |

(Water solubility/dispersibility)

The hot-melt adhesive was placed in water at 20° C. and agitated gently for 1 hour. The condition of the adhesive was then evaluated.

Example 7

Except that 100 parts of an allylsulfonic acid-modified (2.5% copolymerized) polyvinyl acetate (average degree of saponification 20 mole %, average degree of polymerization 250), 20 parts of 14-hydroxyhexadecanoic acid and 25 parts of triethylene glycol were employed, the procedure and experiments of Example 6 were repeated.

Example 8

Except that 100 parts of a polyvinyl acetate (average degree of polymerization 200) modified with 2.0 mole % of polyoxyethylene monoallyl ether (10 ethylene oxide units), 17 parts of sodium 12-hydroxydecanoate and 25 parts of propylene glycol were employed, the procedure and experiments of Example 6 were repeated.

Example 9

Except that 100 parts of a polyvinyl acetate (average degree of saponification 200 mole %, average degree of polymerization 350) modified with 3.0 mole % of polyoxypropylene monoallyl ether (5 propylene oxide units), 20 parts of 12-hydroxyoctadecanoic acid and 25 parts of tetraethylene glycol were employed, the procedure and experiments of Example 6 were repeated.

Example 10

Except that 100 parts of a polyvinyl acetate (average degree of polymerization 300) modified with 3.0 mole % of sodium allylsulfonate, 20 parts of 12hydroxyoctadecanoic acid, 25 parts of glycerin and 10 parts of ethylene-vinyl acetate copolymer (vinyl acetate content 28 wt. %) were employed, the procedure and experiments of Example 6 were repeated.

Comparison Example 3

Except that 12-hydroxyoctadecanoic acid was omitted, the procedure and experiments of Example 6 were repeated.

This resin composition lacked flexibility. Thus, when it was processed into a hot-melt adhesive as in Example 6, the resin composition tended to break on cutting and failed to provide chips of uniform shape.

Comparison Example 4

Except that glycerin was omitted, the procedure and experiments of Example 6 were repeated.

This resin composition lacked flexibility. Thus, when it was processed into a hot-melt adhesive as in Example 6, the resin composition tended to break on cutting and failed to provide chips of uniform shape.

The results of Examples 6–10 and Comparison Examples 3 and 4 are shown in Table 2.

TABLE 2

| | Bond strength (kg/30 mm) | | Blocking resistance | Water solubility or dispersibility |
|---|---|---|---|---|
| | 20° C. × 65% RH | 40° C. × 80% RH | | |
| Example 6 | 0.55 | 0.45 | | Completely dispersed |
| Example 7 | 0.52 | 0.40 | | Completely dispersed |
| Example 8 | 0.51 | 0.41 | | Completely dispersed |
| Example 9 | 0.58 | 0.44 | | Completely dispersed |
| Example 10 | 0.55 | 0.47 | | Completely dispersed |
| Comparison Example 3 | 0.51 | 0.12* | x | Completely dispersed |
| Comparison Example 4 | 0.50 | 0.13* | Δ | Completely dispersed |

*Cohesive failure
Others: Adherend (paper) failure

What is claimed is:

1. A hot-melt adhesive composed of a melt-blended mixture consisting essentially of:
   100 parts by weight of a hydrophilic polyvinyl acetate resin rendered soluble or dispersible in water by partial saponification or introduction of hydrophilic groups (A), wherein said hydrophilic polyvinyl acetate resin (A) is at least one member selected from the group consisting of
   (1) a partially saponified polyvinyl acetate (A1) having an average degree of saponification in the range of 30–85 mole % and an average degree of polymerization in the range of 50–700 and optionally containing a hydrophilic group-containing comonomer unit consisting of a sulfonic acid group-containing monomer unit or an oxyalkylene group-containing monomer unit and
   (2) a polyvinyl acetate resin (A2) having an average degree of saponification in the range of 0–30 mole % and an average degree of polymerization in the range of 50–700 and containing a hydrophilic group-containing comonomer unit consisting of a sulfonic acid group-containing monomer unit or an oxyalkylene group-containing monomer unit in a proportion of 0.1–30 mole %;
   5–100 parts by weight of a hydroxy fatty acid compound of not less than 6 carbon atoms (B); and
   5–50 parts by weight of a plasticizer (C).

* * * * *